Sept. 14, 1937.  C. A. ZECHMAN  2,093,224
CONVERTIBLE SEAT STRUCTURE
Filed July 14, 1936  3 Sheets-Sheet 1
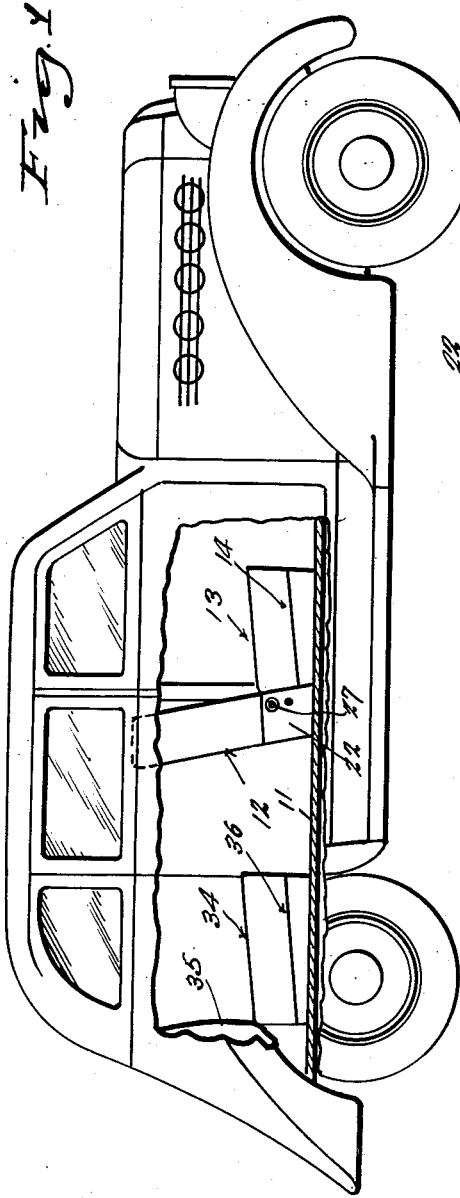
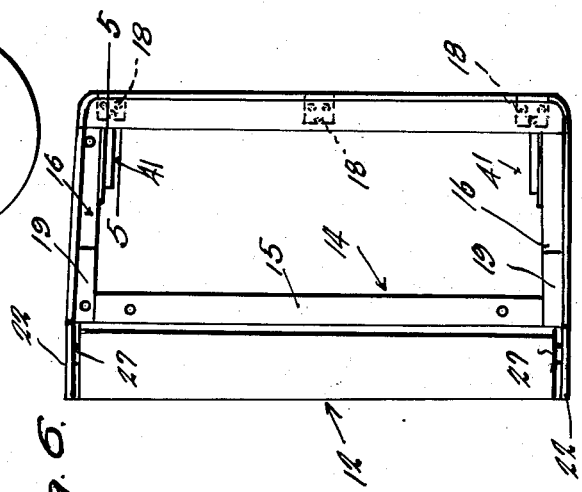
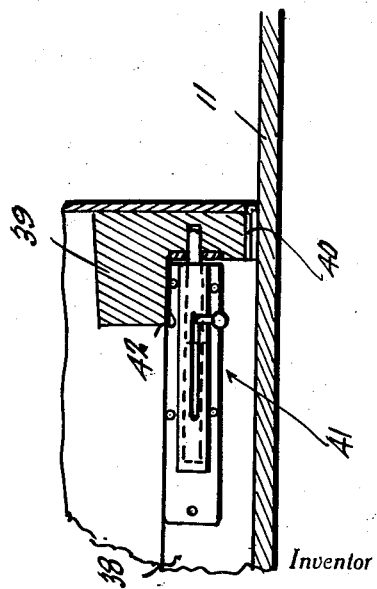
Inventor
Charles A. Zechman
By Clarence A. O'Brien
Attorney Sept. 14, 1937.  C. A. ZECHMAN  2,093,224
CONVERTIBLE SEAT STRUCTURE
Filed July 14, 1936   3 Sheets-Sheet 2
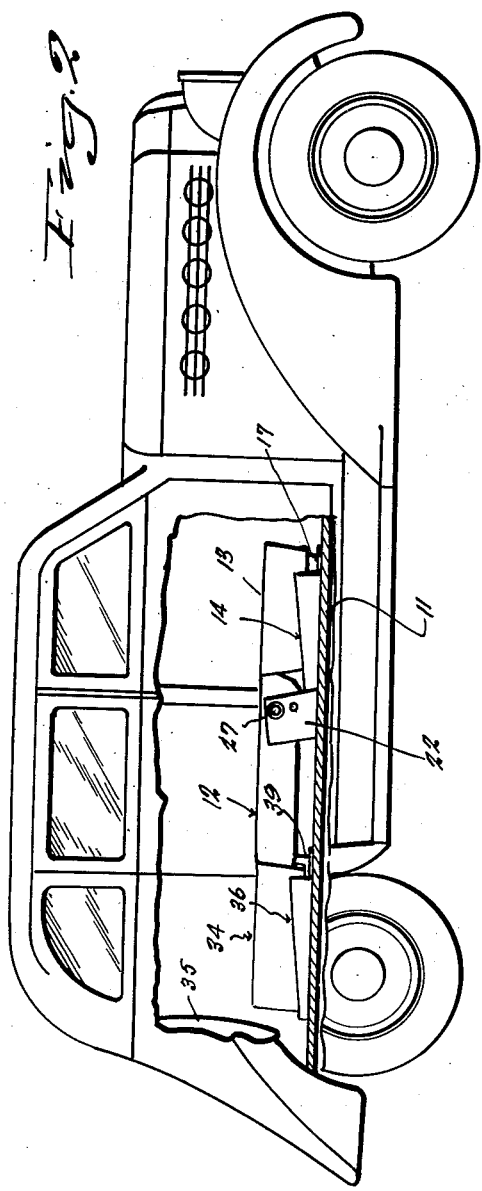
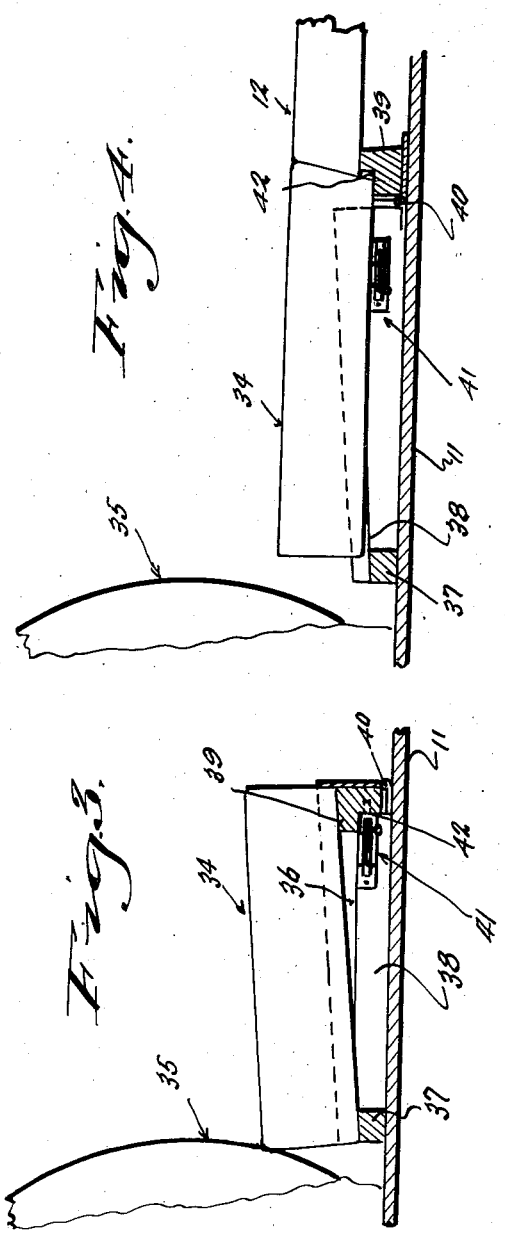
Inventor
Charles A. Zechman
By Clarence A. O'Brien
Attorney Sept. 14, 1937.                    C. A. ZECHMAN                    2,093,224
                              CONVERTIBLE SEAT STRUCTURE
                                 Filed July 14, 1936                3 Sheets-Sheet 3

Inventor
Charles A. Zechman
By Clarence A. O'Brien
                                                              Attorney Patented Sept. 14, 1937

2,093,224

UNITED STATES PATENT OFFICE 2,093,224

CONVERTIBLE SEAT STRUCTURE

Charles A. Zechman, Philadelphia, Pa.

Application July 14, 1936, Serial No. 90,586

2 Claims. (Cl. 155—7)

This invention relates to automobile seat constructions and has more particular reference to the so-called convertible arrangement wherein the front and rear seats are so made as to permit predetermined portions thereof to be adjusted with respect to each other to provide a bed.

Needless to say, I am aware that the convertible seat and bed arrangements for automobile bodies is not broadly new. Under the circumstances it will be manifest that it is my chief aim to generally improve upon prior structures of this general type by providing an arrangement characterized by appreciable refinements and structural improvements especially adapted to serve their proportionate share in the development of an ingenious and dependable accommodation for the occupants of the car when desiring either a comfortable bed or seating conveniences.

Briefly, I accomplish what I desire through the instrumentality of a structure which uses the cushions of the front and rear seats in conjunction with a tiltable or hinged back rest located therebetween so as to provide a quick adjustable three-part bed structure.

As will be evidenced from the succeeding description and the accompanying illustrative drawings, the particular structural novelty is predicated upon the way in which the respective cushions are slidably and detachably mounted on the supporting base means, as well as the way in which the back or back rest of the front seat is swingable downwardly from a perpendicular seat position to a horizontal bed forming position between the two companion cushions.

Other features and advantages will become more readily apparent as the description proceeds.

In the accompanying drawings wherein like numerals are employed to designate like parts throughout the views:

Figure 1 is a side elevational view of a conventional automobile with the side of the body broken away to disclose the convertible seat construction and arrangement.

Figure 2 is a view like Figure 1 showing the parts adjusted to provide a bed structure.

Figure 3 is a view in section and elevation showing the particular construction of the cushion supporting means for the rear or so-called back seat.

Figure 4 is a view illustrating the manner in which the rear cushion is adjusted for cooperation with the adjacent end portion of the tiltable back rest of the front seat to form a part of the bed.

Figure 5 is a view detailing the rear latch construction, the section being taken approximately on the plane of the line 5—5 of Figure 6.

Figure 6 is a top plan view showing the base construction of one of the seats with the cushion removed.

Figure 7 is a view in section and elevation of the front seat structure.

Figure 8 is a view based on Figure 7 showing the manner in which the back rest and cushion in Figure 7 are converted into bed forming relationship.

Figure 9 is an enlarged detail view showing the specific manner and means of supporting the back rest of the front seat.

Figure 10 is an enlarged vertical detail section taken approximately on the plane of the line 10—10 of Figure 9.

By way of introduction and merely as a matter of convenience I will describe the front seat construction first. Calling attention, for example, to Figure 7, it will be observed that the floor of the car is denoted by the numeral 11. The swingable back rest, which is properly cushioned, is indicated by the numeral 12 and the seat or cushion, which is also properly fashioned, is indicated by the numeral 13. This is detachable and longitudinally shiftable in order to permit it to serve the intended purposes. In general configuration it is rectangular and more or less of conventional style. It is removably supported on a sheet metal rimmed base or frame of general rectangular form. The frame is indicated as a unit by the numeral 14. The back rail of the frame is distinguished by the numeral 15 and the transverse end rails are indicated at 16 and the front rail is distinguished by the numeral 17. This is in a sense a batten and it is hingedly attached to the forward end of the end rails as indicated at 18. The rear end portions of the end rails 16 slope downwardly as indicated at 19 to give the desired tilt to the adjacent end portion of the cushion 13 (see Figures 7 and 8). It is also to be noted that the transverse dimension of the hinged batten or front rail 17 is such that when it is in vertical or perpendicular cushion supporting position as shown in Figure 7 it raises this end of the cushion and tilts it on the inclined surfaces 19 and the tapered back rail 15. This is merely to give the cushion the desired seating slope. Incidentally, the numerals 20 designate suitable manually controlled latches accessible when the cushion 13 is lifted up. These are mounted on the end members or rails 16 and are engageable with the front rail 17 to hold it in its normal vertical or upright position. When the rail 17 is swung down, that is outwardly and down as shown in Figure 8 its vertical dimension is then equivalent to the forward vertical dimensions of the end rails 16 so that the surfaces thereof are substantially flush. This allows the cushion 13 to be slipped forwardly and to be reliably supported on these then even surfaces so that it occupies a substantially true or horizontal plane. This is for bed forming use.

I call attention now to a special metal fixture 21 of general U-shaped form which comprises a base strip suitably fastened to the floor, this having upstanding end members or uprights 22 which serve as attaching adapters for the back rest 12. Referring to Figure 10 in this connection it will be observed that a stay bolt 23 is located between the upright 22 and the frame 24 in the body of the car. The numerals 25 merely designate lock nuts designed to promote the desired rigidity and to maintain the uprights 22 in proper vertical position. The uprights are provided with trunnions or pins 26 which serve to accommodate bushings or bearings 27 carried by the vertical members of the frame of the back rest 12. This provides the desired hinged or tiltable connection between the lower end portion of the frame of the back rest 12 and the bracket or fixture 21. Hence it is possible to swing it either to a vertical position or horizontal position as desired.

It will be observed in Figure 9 that the frame structure of the back rest is preferably of sheet metal and that the lower portion thereof is fashioned to include a sheath 28 which serves as a guideway for a latch 29, the latch being operable by the knob or finger piece 30 which is readily accessible. This latch at its lower end is arranged to slip down into a keeper hole in a substantial triangular bracket 31 forming a component part of the U-shaped supporting fixture 21. There may be either one or two of these brackets 31 depending on the rigidity and strength desired. I might also point out that the lower portion 32 of the frame work is shaped to abut firmly on the adjacent portion of the bracket 31 to insure further strength and durability at this particular point. Broadly, however, it will be observed that the lower portion of the frame of the back rest 12 is swingably mounted between the uprights 22 forming the end members of the substantially U-shaped metal fixture 21 which is fastened to the floor. In addition the slidable latch 29 mounted in the guideway 28 provides a convenient means for cooperation with the bracket 31 to hold the back rest 12 in its regulation seat forming position as shown for example in Figures 1, 7 and 9.

When it is desired to convert the front seat into a position to form the two forward sections of the bed, it is evident that it is first necessary to lift up the cushion 13 and to disengage the latches 20. This allows the pivoted back rest 12 to be swung from its vertical position in Figure 7 down to its horizontal position in Figure 8. In this position it cooperates with the end members 16 of the frame structure to provide a convenient reliable abutment and support for the cushion 13. In fact, it allows the cushion to be slipped forwardly so as to provide for clearance when the back rest 12 is swung from its vertical position down to its horizontal position as also shown in Figure 8. To accomplish the latter result all that is necessary to do is to release the latch 29 as is obvious. Then, the parts 12 and 13 are in a plane substantially even with each other to form the major portion of the bed.

The remaining cushion of the back seat denoted by the numeral 34 goes to make up the remainder of the bed. This cushion is normally in contact with the stationary back rest 35 as shown in Figure 3. It is cooperable with a similar base or frame as is evident. The frame 36 comprises the tapered back rail 37 and a tapered top end rail 38 and a hinged forward rail or batten 39. This is hingedly attached in place as at 40 and provided with keeper sockets to accommodate the latches 41. It will be noted that the inside surface (Figure 3) of this batten is rabbeted to provide a ledge 42 to accommodate the adjacent end portions of the latches. It also has an additional function as shown in Figure 4. In other words, when we observe the structure as it appears in Figure 3, we see the groove or rabbet in a latch accommodating position. When, however, the latch 41 is released and the batten is swung forwardly to the horizontal bed forming position shown in Figure 4, the grooved portion serves as a ledge and the upstanding feature serves as a riser to receive and support the adjacent longitudinal edge portion of the back rest 12. This positions the upper surfaces of the rear and front cushions 34 in an even horizontal plane, as distinguished from their natural inclined position and brings all three parts, that is, the two cushions and the back rest into proper bed forming position as shown in Figure 2.

It is to be noted that certain common novelty exists between the way in which the two cushions 13 and 34 are supported. That is to say, the frame structures forming the base portions thereof are more or less the same. Or stated otherwise the frames are so made as to allow the cushions to be put in desired inclined seat forming position or to be shifted to substantially horizontal flush position when used as a bed. It is also to be noted that the hinged front rails of the two frames are somewhat the same in that when they are swung up to vertical position they aid in tilting the cushions. When swung down to horizontal position they provide the desired underlying slats or members for the three cushions then usable as a convenient bed.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having thus described the invention, what is claimed as new is:

1. In a structure of the class described, in combination, a wheel supported vehicle body, a rear seat structure including a fixed back rest and a separable cushion, a base for said cushion comprising a frame, said cushion being shiftable on said frame, said frame including a rail hingedly secured to said body, said rail being adapted for disposition either beneath the cushion for elevating one edge portions thereof, or disposition forwardly of and beyond the cushion to serve as a bed rail, and a front seat construction including a frame, a cushion slidable on said frame, a fixture disposed adjacent the rear of said frame, and a back rest hingedly mounted on said fixture, said back rest when swung down to horizontal bed forming position being engageable with and restable on said hinged rail.

2. In a structure of the class described, a relatively fixed support, a seat construction including a frame mounted on said support, said frame embodying a longitudinal back rail, a spaced parallel front rail, and complemental adjoining transverse end rails, said front rail being hingedly attached to the support and swingable from a position between the adjacent ends of the transverse end rails to a projected position beyond said ends of the end rails, a U-shaped fixture secured to said support adjacent to said back rail, said fixture including a rigidly mounted keeper and stabilizing bracket, a back rest having its lower end portion pivotally mounted between the uprights at the ends of said U-shaped fixture, the swingable lower end of said back rest abutting said stabilizing bracket when the back rest is in perpendicular position, and said lower portion being provided with a sheath, and a hand operated latch slidably mounted in said sheath and releasably engageable with said keeper bracket.

CHARLES A. ZECHMAN.